J. S. Cochran, Ware House Truck.
113263  PATENTED APR 4 1871
Fig: 1.
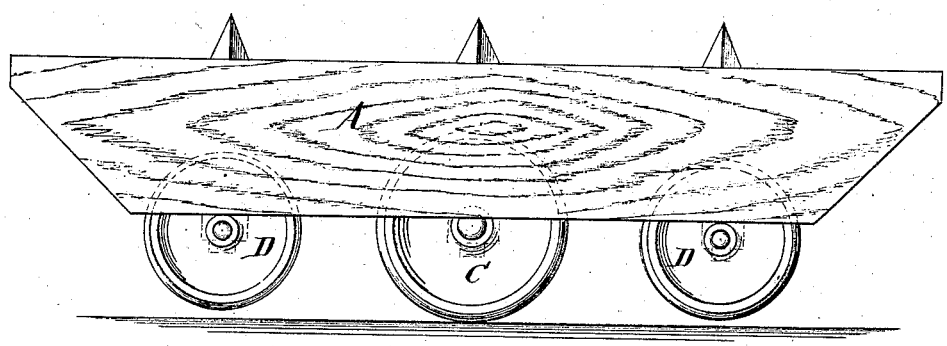
Fig: 2.
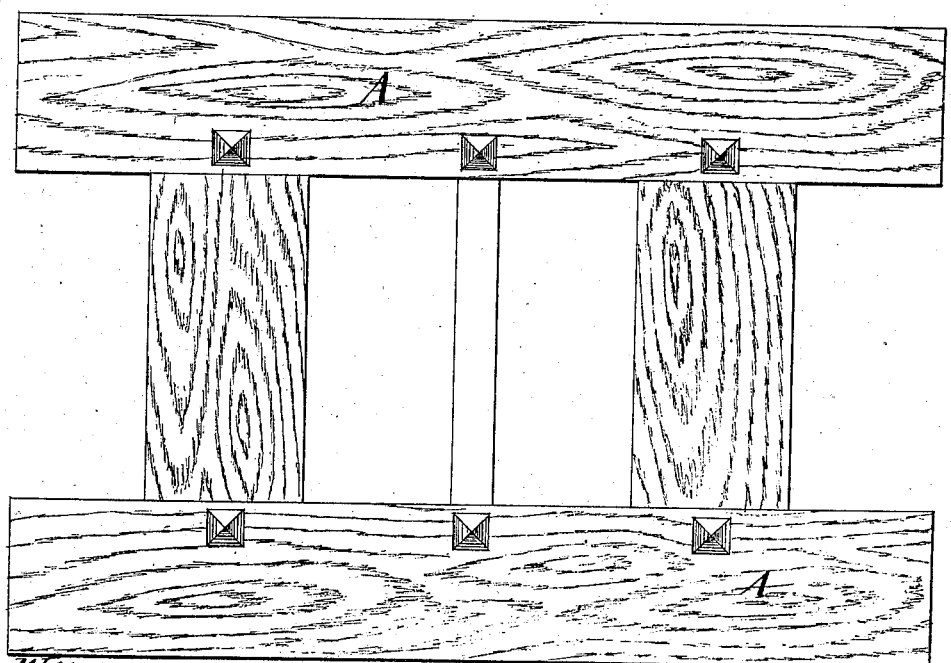
Witnesses
M. Vorlaender
Wm. H. C. Smith
Inventor:
J. S. Cochran
per Munn
Attorneys

United States Patent Office.

JOHN S. COCHRAN, OF NEW YORK, N. Y.

Letters Patent No. 113,263, dated April 4, 1871.

IMPROVEMENT IN WAREHOUSE-TRUCKS.

The Schedule referred to in these Letters Patent and making part of the same.

To all whom it may concern:

Be it known that I, JOHN S. COCHRAN, of the city, county, and State of New York, have invented a new and useful Improvement in Warehouse-Trucks; and I do hereby declare that the following is a full, clear, and exact description thereof, which will enable others skilled in the art to make and use the same, reference being had to the accompanying drawing forming part of this specification.

This invention relates to a new and useful improvement in trucks for warehouses, stores, &c., and consists in providing the ordinary four-wheeled warehouse truck with a pair of wheels placed centrally between the ordinary wheels, and either made of greater diameter or so placed that the periphery of such additional wheels will project below the ordinary wheels, for forming a central-bearing for the truck, and so that when the truck is loaded it may be turned readily on the floor, as upon or around a central-pivot, as will be hereinafter more fully described.

In the accompanying drawing—

Figure 1 is a side elevation.

Figure 2 is a top or plan view.

Similar letters of reference indicate corresponding parts.

A is the frame of the truck, which may be in any form, and of any size convenient for warehouse use.

D represents the additional wheels revolving on an axle the same as the other pairs of wheels.

In this example these wheels are made of greater diameter, so that they will drop a little below the other wheels; but the axle may be placed a little below the other axles, which will allow of the same-sized wheels being used throughout.

In propelling the loaded truck, these two additional wheels and either pair of the others are used.

When a corner is to be turned with the truck, it is tipped so that the central wheels C will form the entire bearing, in which situation the truck may be turned or revolved as around a central pivot, thus obviating the difficulty experienced in the use of the common four-wheeled truck in turning corners.

Having thus described my invention,

I claim as new and desire to secure by Letters Patent—

In the warehouse four-wheeled truck, the wheels C, arranged to operate substantially as and for the purposes described.

The above specification of my invention signed by me this 11th day of February, 1871.

JOHN S. COCHRAN.

Witnesses:
  GEO. W. MABEE,
  ALEX. F. ROBERTS.